Aug. 25, 1936.   G. W. BAUGHMAN   2,052,205
RETARDATION CONTROLLER
Filed Jan. 18, 1934   2 Sheets-Sheet 1
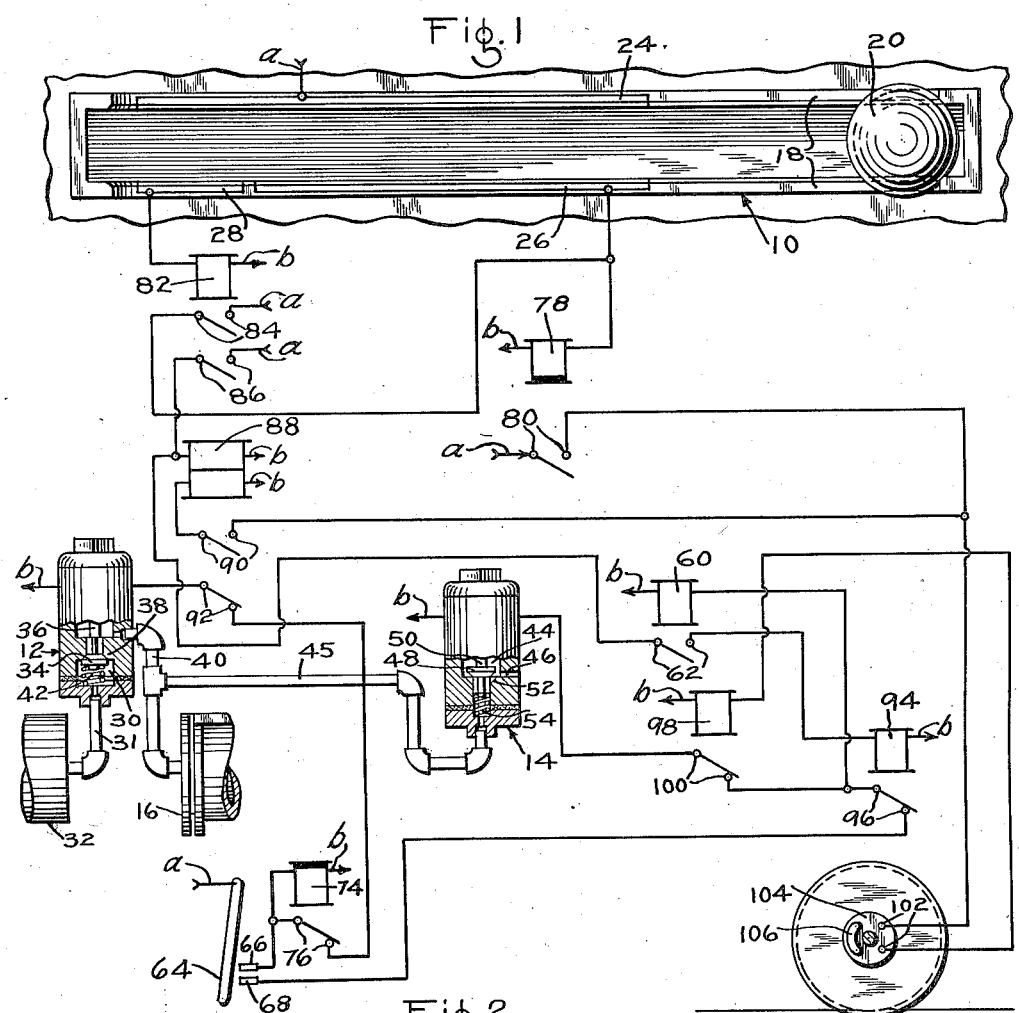
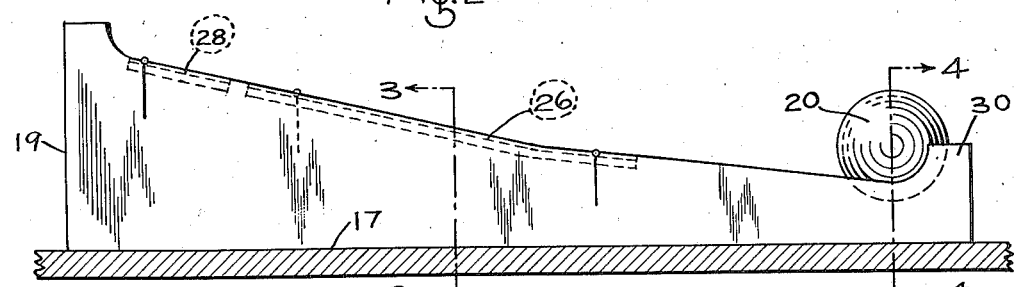
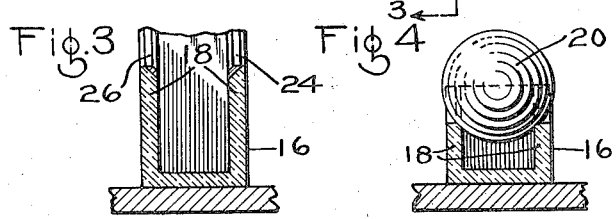
INVENTOR
GEORGE W. BAUGHMAN
BY Wm. U. Cady
ATTORNEY Aug. 25, 1936.  G. W. BAUGHMAN  2,052,205
RETARDATION CONTROLLER
Filed Jan. 18, 1934  2 Sheets-Sheet 2
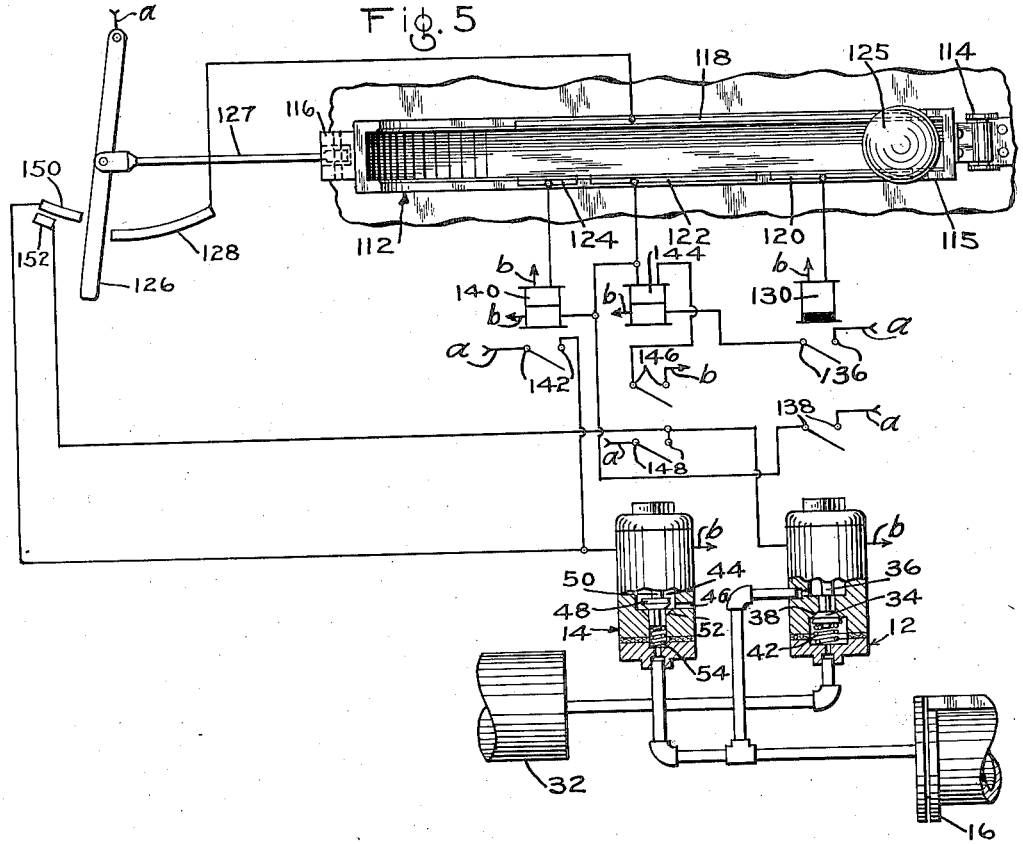
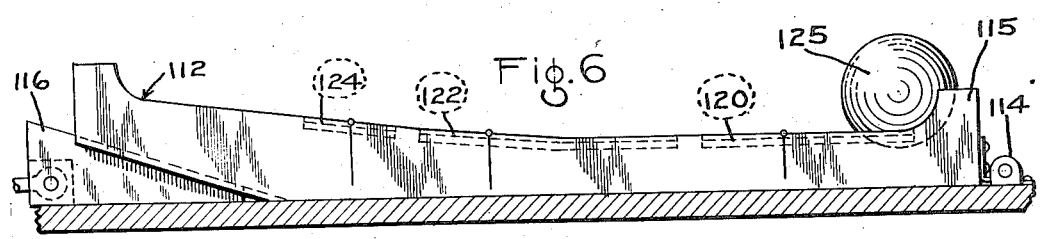
INVENTOR
GEORGE W. BAUGHMAN
BY *Wm. M. Cady*
ATTORNEY Patented Aug. 25, 1936

2,052,205

UNITED STATES PATENT OFFICE 2,052,205

RETARDATION CONTROLLER

George W. Baughman, Edgewood, Pa., assignor to The Westinghouse Air Brake Company, Wilmerding, Pa., a corporation of Pennsylvania Application January 18, 1934, Serial No. 707,043

17 Claims. (Cl. 303—24)

This invention relates to retardation controller devices, and more particularly to retardation controller devices for controlling the retardation of railway vehicles.

If the brakes of a railway vehicle equipped with friction brakes are applied with a maximum braking force when the vehicle is traveling at a relatively high speed, then this braking force must be diminished as the speed of the vehicle diminishes, because the coefficient of friction between the rubbing parts of the brake increases as the speed of the vehicle diminishes, and if the braking force is maintained constant wheel skidding may result. The necessary reduction in the applied braking force may be effected by manipulation of the usual brake valve device, or by some form of automatic means. One form of automatic means is that which controls the applied braking force in a manner such that the rate of retardation due thereto is maintained substantially constant.

It is a principal object of my invention to provide means employing an element responsive to variations in the rate of retardation for controlling the supply of fluid under pressure to and its release from a brake cylinder.

It is another object of my invention to provide a retardation controller apparatus of the inclined plane type, which is of simple construction and readily adaptable to the control of an electro-pneumatic or other type brake.

A yet further object of my invention is to provide a retardation controller device of the inclined plane type which has associated therewith means providing for the selection of different rates of retardation due to braking, and means for automatically controlling the brakes to maintain the selected rate of retardation.

A still further object is to provide means in connection with a retardation controller device for releasing the brakes in the event of wheel skidding, the release of the brakes being continued so long as wheel skidding takes place, but ceasing as soon as the skidding wheels commence to rotate again.

Other important objects and advantages will be apparent from the following description, which is taken in connection with the attached drawings, in which Fig. 1 is a schematic arrangement of one embodiment of my invention for controlling an electro-pneumatic brake.

Fig. 2 is a vertical side view of the retardation controller device shown in Fig. 1.

Fig. 3 is a view along the line 3—3 of Fig. 2.

Fig. 4 is a view along the line 4—4 of Fig. 2.

Fig. 5 is a schematic arrangement of apparatus comprising another embodiment of my invention for controlling an electro-pneumatic brake.

Fig. 6 is a vertical side view of the retardation controller device shown in Fig. 5.

Considering first the embodiment shown in Fig. 1, I have provided a retardation controller device 10 for operating a supply magnet valve device 12 and a release magnet valve device 14, for controlling the supply of fluid under pressure to and its release from a brake cylinder 16.

The retardation controller device 10 comprises a body 19, preferably of some electrically insulating material, such for example, as molded bakelite, hard rubber, or the like, which is provided with a flat base 17 adapted to be secured to some part of the vehicle which will maintain the base portion 17 substantially horizontal with respect to the line of travel of the vehicle.

The body 19 is also provided with an inclined trackway 18, the lowermost portion of the trackway having one degree of inclination or slope and the uppermost portion having another degree of inclination or slope.

Embedded in the material forming the body 19 and having an exposed face in flush relation with and forming part of one side of the trackway 18 is a contact strip 24. Also similarly disposed along the adjacent and opposite side of the trackway and insulated from each other are contact strips 26 and 28. The contact strip 24 is arranged with respect to the contact strips 26 and 28 so that it may be connected to the contact strips 26 and 28 sequentially, or successively, by a moving mass, as a metallic ball 20, when the mass is caused to move along the trackway 18.

The body 19 is secured to a vehicle in a manner such that when the vehicle is at rest or traveling at a constant rate of speed, the ball 20 will assume a position at the foot of the inclined trackway 18 against a stop or rest 30 integral with the body 19.

When the vehicle is decelerating, force of inertia will act upon the ball 20 to roll it up the inclined trackway. The rate at which the ball rolls up the trackway will be dependent upon the rate of retardation of the vehicle and the slope of the portion of the trackway upon which the ball is rolling. For example, a given rate of retardation will cause the ball 20 to roll up the first portion of the trackway at one rate, while the same rate of retardation will cause the ball to roll up the latter part of the trackway at a lower rate, since the slope of the latter portion is greater than that of the first portion. The purpose of having the ball 20 roll up the inclined trackway and successively connect the contact strip 24 with the contact strips 26 and 28 will appear presently.

The supply magnet valve device 12 comprises a casing defining a valve chamber 30 which is in constant communication with a source of fluid under pressure, as for example, a reservoir 32, by a pipe 31. Disposed in the valve chamber 30 is a valve 34 secured to a valve stem 36 and adapted to cooperate with a valve seat 38 to control the supply of fluid under pressure from the reservoir 32 to the brake cylinder 16 through pipe 40. The valve 34 is urged to seated position by a spring 42, and is urged to unseated position by action of an electro-magnet (not shown) within the casing which when energized moves the valve stem 36 downwardly to unseat the valve 34.

The release magnet valve device 14 comprises a casing defining a valve chamber 44 which is in constant communication with the atmosphere through port 46. Disposed in the valve chamber 44 is a valve 48, secured to a valve stem 50 and cooperating with a valve seat 52 to control the release of fluid pressure from the brake cylinder 16 to the atmosphere through pipe 45 and port 46. The valve 48 is urged to unseated position by a spring 54, and to seated position by an electro-magnet (not shown) within the casing which when energized moves the valve stem downwardly to seat the valve 48.

For operating the supply magnet valve device 12 and the release magnet valve device 14 in accordance with the position of the ball 20 on the inclined trackway 18, I have provided a plurality of relays which will be referred to presently in connection with a description of the operation of this embodiment of my invention.

For effecting an application of the brakes I have provided a contact making handle 64 for making contact with contacts 66 and 68, and which is in release position when out of engagement with the contacts 66 and 68, as shown in Fig. 1, and in application position when in contact therewith.

In the description of operation of this and the other embodiment which follows, I have for convenience indicated all conductors which are connected to one side of a source of current supply, such, for example, as a battery, by the letter *a*, and all conductors which are connected to the other side of this source by the letter *b*, so that it may be assumed that current flows from this source through the conductors marked *a*, and back to the source through the conductors marked *b*.

In operation, when it is desired to effect an application of the brakes, the handle 64 is moved to application position, whereupon current is supplied through contact 68 to the electro-magnet of the release magnet valve device 14 to cause the valve 48 to be seated, thereby cutting off the venting of the brake cylinder 16 to the atmosphere. Also, a slow pick up relay 74 is energized by current supplied through the contact 66. However, before the relay 74 has opened its contacts 76, current is supplied through the contacts 76 to the electro-magnet of the supply magnet valve device 12, whereupon valve 34 is unseated and fluid under pressure flows from the reservoir 32 past the unseated valve 34 to the brake cylinder 16 through pipes 31 and 40.

As pressure in the brake cylinder builds up the brakes are applied with increasing force. The relay 74 is designed to open contacts 76 when the pressure in the brake cylinder has reached a predetermined or chosen value, after which the electro-magnet in the supply valve device 12 is deenergized and the valve 34 is seated by action of spring 42, to cut off the supply of fluid to the brake cylinder.

Current is also supplied through contact 68 to energize a relay 60 to close contacts 62, for a purpose which will appear presently.

Assuming that the vehicle is decelerating on a level track, or roadway, the ball 20 rolls up the inclined trackway 18. As before described, the inclination or slope of the first portion of the trackway is such that the ball does not begin to roll thereon until a certain rate of retardation has been exceeded. Above this rate the ball begins to roll up the trackway. In a like manner, the upper portion of the trackway has an inclination such that the ball will not roll thereup below a certain rate of retardation.

However, since fluid is initially supplied to the brake cylinder at a maximum rate, only a short interval elapses until the ball rolls up the first portion of the trackway and bridges between the contact strips 24 and 26, whereupon a slow release relay 78 is energized, thereby closing contacts 80. Closing of contacts 80 will have no effect upon the retardation of the vehicle as yet and the ball 20 will continue to roll up the trackway until it bridges contact strips 24 and 28.

Bridging of contacts 24 and 28 energizes relay 82, thereby closing contacts 84 and 86. Closing of contacts 86 energizes relay 88, thereby closing contacts 90 and opening contacts 92. If the relay 74 has not by this time opened contacts 76 then opening of the contacts 92 interrupts the circuit to the electromagnet of the supply valve device 12, whereupon the valve 34 is seated by the spring 42 and the supply of fluid to the brake cylinder is cut off. The supply of fluid under pressure to the brake cylinder may therefore be cut off either by operation of the relay 74, or by operation of the retardation controller device, depending on which occurs first.

It is to be understood however that before the supply is cut off due to operation of relay 74 sufficient pressure will have been developed in the brake cylinder to produce the desired maximum rate of retardation, which will in general result in operation of relay 88. It will be apparent then that fluid under pressure is only supplied to the brake cylinder during the initial stage of a brake application.

Closing of contacts 86 also energizes a relay 94 through the contacts 62 of the already energized relay 60. Energization of relay 94 causes contacts 96 to open the circuit to the electro-magnet of the release magnet valve device 14. Fluid pressure will, therefore, be released from the brake cylinder 16 to the atmosphere through pipe 45 and port 46. This release will, however, be very shortly interrupted because opening of contacts 96 also causes deenergization of the relay 60, which opens contacts 62 to deenergize the relay 94, whereupon contacts 96 again close to again energize the electro-magnet of the release valve device 14.

A little thought will show that so long as the contacts 86 of relay 82 are closed, the relays 60 and 94 will continue to intermittently energize each other, to intermittently effect a release of fluid pressure from the brake cylinder 16, until the rate of retardation has dropped to the point where the ball 20 has rolled out of contact with the contact strip 28. When this happens relay 82 will be deenergized and contacts 84 and 86 will be opened. Relay 88 is, however, maintained energized due to energization of a holding coil therein when contacts 90 are closed, current being supplied through contacts 80 which have been held closed due to energization of the relay 78 through contacts 84 of relay 82. Relay 78 remains closed while the ball 20 passes from the contact strip 28 to the contact strip 26 due to the slow release feature of the relay.

As the ball 20 rolls out of contact with the contact strip 28, the supply of fluid to the brake cylinder will be lapped. The braking force produced by this lap condition will produce a rate of retardation which will hold the ball 20 on the inclined trackway in contact with contact strip 26.

As the speed of the vehicle diminishes, the coefficient of friction between the rubbing parts of the brakes will increase, and the rate of retardation will therefore increase, so that the ball will again roll up the trackway and again contact with contact strip 28 to further release fluid pressure from the brake cylinder in the manner just described.

It will therefore be obvious that as the speed of the vehicle diminishes further, the rate of retardation will again increase due to the increase in coefficient of friction between the rubbing parts of the brakes, and the ball 20 will therefore roll back and forth up and down the trackway to effect a release of fluid pressure in the brake cylinder to maintain the rate of retardation due to braking substantially constant. As the vehicle nears a stop, application and release of the brakes may be controlled by the handle 64 to bring the vehicle to a stop smoothly and without shock.

When the vehicle has been brought to a stop, or when the rate of retardation is such that the force of inertia is insufficient to maintain the ball 20 on the lower portion of the trackway, the ball will roll to the foot of the inclined plane against the rest 30.

In order to effect a release of fluid pressure from the brake cylinder 16 at any time the wheels begin to slide, I have provided a relay 98 having contacts 100 in the circuit leading to the electromagnet of the release magnet valve device 14. The relay 98 is adapted to be energized through contacts 102, secured to an insulating member 104, which is adapted to rotate with a wheel of the vehicle. A relatively stationary contact 106 is provided for intermittently bridging the contacts 102.

When the wheel of the vehicle is rotating at a speed above a certain predetermined value, the frequency of contact between the stationary contact 106 and the movable contacts 102 is such that the relay 98 is insufficiently energized to open contacts 100. However, when the wheel is caused to slide it must change from a rolling speed to zero speed, and during this interval the frequency of contact between the contacts 106 and 102 will be such that the relay 98 will be energized sufficiently to open the contacts 100, thereby deenergizing the electro-magnet of the release magnet valve device 14 and releasing fluid pressure from the brake cylinder 16. It is to be understood that the wheel does not actually cease rotating, but while the speed of the wheel is diminishing below that corresponding to the speed of the vehicle pressure will be released from the brake cylinder, by operation of the release magnet valve device 14, so that the speed of rotation of the wheel will cease to diminish and will begin to increase. The parts of the magnet valve device 14 are so designed that the rate of release of pressure from the brake cylinder is great enough so that the wheel which begins to slide does not reach the "locked-wheel" stage. When the braking force has been reduced sufficiently so that the wheel begins to rotate again at the speed corresponding to the speed of the vehicle, the relay 98 will be insufficiently energized, contacts 100 will close, and venting of the brake cylinder due to relay 98 will cease.

It will be noted, however, that relay 98 can be energized through the contacts on the wheel only when relay 78 is energized and contacts 80 thereof are closed. For relay 78 to be energized, the ball 20 must have rolled up the inclined trackway at least far enough to bridge contacts 24 and 26. Therefore, when the vehicle speed diminishes to the point where the speed of rotation of the vehicle wheels reaches the value at which relay 98 is energized, the brakes will be released until the ball 20 will have rolled down the trackway out of engagement with contacts 24 and 26. As the vehicle decelerates then the wheel contacts and relay 98 function to establish a new low limit for the rate of retardation to be maintained by the retardation controller device. The relay 98 and the wheel contacts 102, 104 and 106, thus provide for establishing a new and lower limit of rate of retardation as the speed of the vehicle diminishes, as well as providing for relieving a sliding or slipping wheel condition at any rate of retardation above this low limit.

While I have shown only one set of contacts 102 associated with one wheel of the vehicle, it is to be understood that I may provide a set of such contacts, a relay 98, supply and release magnet valve devices 12 and 14, and a brake cylinder 16 for each axle of the vehicle, so that the brakes may be released on wheels in pairs, in the event of wheel skidding.

Considering now the embodiment of my invention shown in Fig. 5, I have provided a retardation controller device 112, similar to that heretofore described in connection with Fig. 1, but having a pivotal connection at one end with some portion of the vehicle with which it is to be associated, as by a hinge 114, and being adapted to be rotated about this hinge by the sliding of a wedge member 116 under the other end thereof.

In this embodiment the retardation controller device is provided with an inclined trackway having three degrees of inclination or slope, the portion of the trackway to the right being substantially horizontal when the wedge member 116 has not caused an elevation of the left end of the device, the middle portion of the trackway having a slight inclination or slope, and the extreme left portion having a slope or inclination slightly greater than the middle portion.

Along one side of the trackway I have disposed a contact slip 118, in flush relation with the rolling surface of the trackway, as before, and along the opposite side of the trackway and insulated from each other I have provided contact strips 120, 122 and 124.

As in the other embodiment, a metallic ball 125 is adapted to roll along the trackway under force of inertia. When the ball 125 is in its extreme position to the right, as against a rest 115, it bridges between contact strips 118 and 120, and as it is caused to roll along the trackway it bridges, successively, between contact strips 118 and 122 and contact strips 118 and 124. As the ball rolls to the extreme left hand portion of the trackway it entirely disengages from the contact strips, thereby interrupting such circuits as were formed previously.

For actuating the wedge member 116 back and forth, for the purpose of raising and lowering the left end of the retardation controller device 112 so that different rates of retardation may be selected, I have provided a handle 126 connected with the wedge member 116 by a rod 127. Moving the wedge member 116 under the retardation control device 112 by movement of the handle 126 to the right elevates the inclined trackway, thereby increasing the inclination or slope of the several portions comprising it.

Since the force of inertia acting upon the ball 125 to roll it up the inclined trackway depends upon both the rate of retardation of the vehicle and the inclination of the trackway, it will be obvious that with each degree of inclination of each portion of the trackway a different rate of retardation is required to cause the ball to roll up that portion of the trackway. When the trackway is only slightly elevated by movement of the wedge member 116, the retardation controller device will be effective in maintaining a relatively low rate of retardation, and for a relatively high degree of elevation of the trackway, as by moving the handle 126 the full distance to the right, the device will be effective in maintaining a high rate of retardation.

For convenience, I have shown an equipment employing the same supply and release magnet valve devices, brake cylinder and reservoir, as before described.

In the operation of this embodiment, when it is desired to effect an application of the brakes, the handle 126 is moved to the right a distance in accordance with the desired rate of retardation to be maintained. As the handle 126 is moved to the right it engages a contact 128, thereby connecting the contact strip 118 of the retardation controller device to a suitable source, so that with the ball 125 bridging between contact strips 118 and 120 a slow release relay 130 is energized, whereupon contacts 136 and 138 are closed.

Closing of contacts 138 energizes relay 140 to close contacts 142, whereupon current flows to and energizes the electro-magnet of the release magnet valve device 14. Venting of the brake cylinder 16 is thereby cut off.

Closing of contacts 136 energizes relay 144 to close contacts 146 and 148. Closing of contacts 148 supplies current to and energizes the electro-magnet of the supply magnet valve device 12, thereby permitting fluid under pressure to flow from the reservoir 32 past the unseated valve 34 to the brake cylinder 16. The brakes are therefore applied with fluid pressure building up in the brake cylinder at a maximum rate.

Assuming the vehicle to be running on a level track, a rate of retardation is soon reached at which the force of inertia acting upon the ball 125 is sufficient to cause the ball to roll up the now inclined first portion of the trackway. As the ball rolls off the contact strip 120, the relay 130 will be deenergized, but the slow release characteristic of the relay will hold contacts 136 and 138 closed until the ball has come into contact with contact strip 122, whereupon relays 140 and 144 will be maintained energized by the bridging of the ball across contact strips 118 and 122, the latter relay having a holding coil now energized through holding contacts 146.

As the ball rolls along the contact strip 122 it will reach the middle inclined portion of the trackway, and will tend to slow down or stop. However, as the speed of the vehicle diminishes, the coefficient of friction between the rubbing parts of the brakes increases, so that the rate of retardation will increase and consequently the force of inertia acting upon the ball. The ball will, therefore, continue to roll up the trackway, and as it reaches the upper end of the contact strip 122 and rolls out of contact therewith, relay 144 will be deenergized, thereby opening contacts 146 and 148. The electro-magnet of the supply valve device 12 will, therefore, be deenergized and the supply of fluid under pressure to the brake cylinder will be cut off.

The slope of the trackway increases again at the end of the contact strip 122, so that the ball rolls onto the contact strip 124 at a reduced rate of travel.

With the ball bridging between contact strips 118 and 124, a holding coil of relay 140 is energized and the supply of fluid to the brake cylinder is, therefore, lapped. With the brakes thus held applied and the speed of the vehicle decreasing, the coefficient of friction between the rubbing parts of the brake will increase, thus increasing the rate of retardation. The increased rate of retardation will cause the ball to move further up the trackway. As the ball rolls out of contact with the contact strip 124, relay 140 will be deenergized, whereupon the electro-magnet of release magnet valve device 14 will be deenergized, and fluid pressure will be released from the brake cylinder to the atmosphere.

When the braking force has thus been reduced to the point where the rate of retardation is insufficient to maintain the ball on the upper portion of the trackway, it will begin to roll down the trackway to the right. As the ball again engages contact strip 124 the venting of the brake cylinder will be cut off, and the brakes will again be lapped.

If now the rate of retardation should again increase so that the ball is again moved up the trackway and out of contact with contact strip 124, a further release of fluid pressure from the brake cylinder will be effected.

However, if the first or any subsequent release of fluid pressure from the brake cylinder effects a rate of retardation such that the ball rolls down the trackway and onto the contact strip 122, fluid will not again be supplied to the brake cylinder as relay 144 is deenergized and cannot again be energized until relay 130 has been energized.

Since with diminishing speed the tendency is always for the rate of retardation to increase, due to the increasing coefficient of friction between the rubbing parts, the force acting upon the ball tends to always urge the ball up the trackway, whereby it acts to intermittently release fluid pressure from the brake cylinder, to maintain the rate of retardation selected by elevation of the left end of the trackway by the wedge member 116. If the elevation of the left end is great, a higher rate of retardation is required to roll the ball up to the point where it effects first a lapping, and subsequently a release of the fluid pressure to the brake cylinder.

If the inclination of the left end is small, a low rate of retardation will cause the ball to lap and then release the supply of fluid pressure to the brake cylinder.

As the vehicle approaches a stop, the rate of retardation can be controlled by manipulation of the handle 126, so that the vehicle may be brought to a stop smoothly and without shock.

If for some accidental or other reason the retardation controller device 112 should be rendered inoperative, an application of the brakes may be effected by moving the handle to the left or emergency position into engagement with contacts 150 and 152. The handle engages contact 150 first, thereby energizing the electromagnet of the release magnet valve device 14 to cut off venting of the brake cylinder, and subsequently engages contact 152 to energize the electro-magnet of the supply valve device 12 to supply fluid under pressure to the brake cylinder. The brakes may be lapped by moving the handle out of contact with contact 152 but maintaining contact with contact 150.

While this movement of the handle 126 to the left is intended to be used for emergency purposes only, it may also be used in bringing the vehicle to a stop after the retardation controller device has maintained a rate of retardation substantially constant over the major portion of the deceleration period, and it may also be used to hold the vehicle at rest after it has been brought to a stop.

In the embodiments described and illustrated I have shown a retardation controller device having a trackway comprised of several straight track portions of different degrees of inclination or slope, so that different rates of retardation are required to cause the ball to roll along the trackway, but I wish it understood that I do not intend to be limited to trackways in which the several portions have a fixed degree of inclination or slope. Since each straight portion of the trackway may be considered as a tangent of an arc, it will be apparent that I may provide a curved trackway, so that each elemental part of the trackway may be considered as a straight portion, or as a tangent of the arc corresponding to the curvature of the trackway. In rolling up such a curved trackway, the ball would act very much as a pendulum swinging through an arc corresponding to the radius of curvature of the trackway. I, therefore, desire that my invention be understood to include retardation controller devices having either a straight trackway or one in which the slope changes at either regular or irregular intervals.

While I have shown and described my invention with particular reference to an electro-pneumatic brake, it is to be understood that I do not wish to be limited to this application, but include all such other applications to which my invention may be adapted, and which are within the spirit and scope of the appended claims.

Having now described my invention, what I claim as new and desire to secure by Letters Patent, is:

1. In a vehicle brake apparatus, the combination with a brake cylinder, of an inclined trackway, a rolling mass on said trackway adapted to be rolled therealong upon a change in the rate of speed of the vehicle, and means rendered operative for one position of said mass for effecting an intermittent release of fluid pressure from said brake cylinder.

2. In a vehicle brake apparatus, the combination with means including a control element for initiating an application of the brakes, of time delay means rendered operable by movement of said control element, means controlled by said time delay means for effecting a lap condition of the brakes, means for effecting a release of the brakes, and a retardation controller device for controlling both said lap means and said release means.

3. In a vehicle brake apparatus, the combination with a brake cylinder, of means for effecting a supply of fluid under pressure to said brake cylinder and for cutting off said supply, a relay adapted to be energized when fluid is supplied to said brake cylinder and operable to effect a cut-off of said supply after a predetermined interval of time, means for effecting a release of fluid pressure from said brake cylinder, and a retardation controller device operable to effect operation of both said cut-off means and release means.

4. In a fluid pressure brake apparatus, the combination with a brake cylinder, of a magnet valve device operable to control the supply of fluid under pressure to said brake cylinder, means for energizing said magnet valve device to effect a supply of fluid under pressure to said brake cylinder, a relay adapted to be energized simultaneously with energization of said magnet valve device and operable to deenergize said magnet valve device after a predetermined interval of time, a second relay operable to also deenergize said magnet valve device, and retardation controller means for controlling said second relay.

5. In a fluid pressure brake apparatus, the combination with a brake cylinder, of a magnet valve device for controlling the supply of fluid under pressure to said brake cylinder, a magnet valve device for controlling the release of fluid pressure from said brake cylinder, means for energizing said supply magnet valve device to effect a supply of fluid under pressure to said brake cylinder, a relay adapted to be energized simultaneously with energization of said supply magnet valve device and operable to effect deenergization of said supply magnet valve device after a predetermined interval of time, a second relay operable when energized to also effect deenergization of said supply magnet valve device, electroresponsive means operable to effect intermittent operation of said release magnet valve device, and a retardation controller device for controlling both said second relay and said electroresponsive means.

6. In a fluid pressure brake apparatus, the combination with a brake cylinder, of a magnet valve device operable to release fluid pressure from said brake cylinder, a circuit adapted to supply current to said magnet valve device, a relay having normally closed contacts in said circuit, a second circuit for supplying current to said relay, a second relay having normally open contacts in said second circuit, means whereby the contacts of said first relay control energization of said second relay, a retardation controller device, and means controlled by said retardation controller device for effecting a supply of current to said first relay, whereby said second relay and said first relay are caused to intermittently energize and deenergize each other.

7. In a vehicle brake system, the combination with a brake cylinder, of an inclined trackway having parallel and upwardly projecting flanges forming a trackway, a contact disposed along one of said flanges, a plurality of contacts disposed along the other of said flanges, a rolling mass adapted to be rolled along said trackway to sequentially connect said plurality of contacts to said first mentioned contact, and electroresponsive means controlled by engagement of said mass with said contacts for controlling the supply of fluid under pressure to and its release from said brake cylinder.

8. In a vehicle brake system, the combination with a brake cylinder, of an application magnet valve device, a release magnet valve device, said devices controlling respectively the supply of fluid under pressure to and its release from said brake cylinder, a retardation controller device having a single contact arranged in spaced relation to and coextensive with a plurality of contacts and a rolling mass adapted to connect said single contact sequentially to said plurality of contacts, a slow acting relay connected to one of said contacts, a relay controlling operation of said application magnet valve device connected to another of said contacts, a relay controlling operation of said release magnet valve device connected to another of said contacts, and circuit means whereby said relays are controlled by engagement of said rolling mass with said contacts to effect operation of said application magnet valve device to cut off the supply of fluid to said brake cylinder at one rate of retardation and to effect operation of said release magnet valve device to release fluid pressure from said brake cylinder at another rate of retardation.

9. In a fluid pressure brake system, the combination with a brake cylinder, of a retardation controller device having an inclined trackway with contacts disposed therealong and a rolling mass adapted to roll up said trackway by force of inertia, electroresponsive means operative upon engagement of said rolling mass with said contacts for controlling the supply of fluid under pressure to and its release from said brake cylinder, a control element having a neutral position and operable in either a forward or reverse direction, means responsive to a movement of said element in one direction for varying the inclination of said trackway to vary the operation of said retardation controller device, and means responsive to movement of said element in an opposite direction for controlling said electroresponsive means independent of operation of said retardation controller device.

10. A vehicle braking system comprising an application magnet valve device, a release magnet valve device, manually operable means for energizing said devices, a normally deenergized application relay operable when energized to deenergize said application magnet valve device independent of operation of said manual means, a normally deenergized release relay operable when energized to deenergize said release magnet valve device independent of operation of said manual means, a retardation controller device having two normally open contacts closable at relatively low and relatively high retardation rates respectively, a normally deenergized third relay adapted to be energized when said low rate contact is closed, a normally deenergized fourth relay adapted to be energized when said high rate contact is closed, means for energizing said third relay when said fourth relay is closed even though said low rate contact is open, means for energizing said application relay when said fourth relay is closed and for subsequently maintaining it energized while said third relay is closed, and means for energizing said release relay when and only when said fourth relay is closed.

11. A vehicle braking system comprising an application magnet valve device, a release magnet valve device, manually operable means for energizing said devices, a normally deenergized application relay operable when energized to deenergize said application magnet valve device independent of operation of said manual means, a normally deenergized release relay operable when energized to deenergize said release magnet valve device independent of operation of said manual means, a retardation controller device having two normally open contacts closable at relatively low and relatively high retardation rates respectively, means for energizing said application relay and said release relay when said high rate contact is closed, and means for subsequently maintaining said application relay only energized when said low rate contact is closed.

12. A vehicle braking sytem comprising an application magnet valve device, a release magnet valve device, a retardation controller device having a normally closed first contact and normally open second and third contacts, said first contact being adapted to be opened at a relatively low rate of retardation and said other contacts being adapted to be closed at other rates of retardation, a normally open manually operated contact, a first relay operable only when said manually operated contact and said first retardation contact are closed, a second and third relay, means for operating said second and third relays when said first relay is operated, a holding circuit for said second relay including said manually operated contact and said second retardation controller contact, means for operating said third relay when said manually operated contact and either said second or said third retardation controller contact are closed, means for energizing said application valve device when said second relay is operated, and means for energizing said release valve device when said third relay is operated.

13. A vehicle braking system comprising an application magnet valve device, a release magnet valve device, a retardation controller device having three contacts, the first of said contacts being normally closed and being adapted to be opened at a relatively low rate of retardation of the vehicle and the second and third of said contacts being normally open and adapted to be closed at intermediate and high retardation rates respectively, a normally open manually operated contact, means for energizing both of said valve devices when said manually operated contact and said first retardation controller contact are closed and for subsequently maintaining both of said valve devices energized when said second retardation controller contact closes, and means for energizing said release valve device only when said third retardation controller contact and said manually operated contact are closed.

14. In a vehicle brake apparatus, in combination, a brake cylinder, means for effecting a supply of fluid under pressure to said brake cylinder, a retardation controller device having a first contact and a second contact and a body operated at one rate of retardation of the vehicle to engage said first contact and at a higher rate of retardation to engage said second contact, means responsive to engagement of said body with said second contact for cutting off the supply to said brake cylinder and releasing fluid under pressure therefrom, and means for maintaining said supply cut off until said body has disengaged from both of said contacts.

15. In a vehicle brake system, in combination, a brake cylinder, electroresponsive valve means operable when energized to effect a supply of fluid under pressure to said brake cylinder, a circuit for supplying current to said electroresponsive valve means, a normally deenergized relay operable when energized to open said circuit, a retardation controller device having a first contact and a second contact and a body operated according to the rate of retardation of the vehicle for first engaging said first contact and for then engaging said second contact, means responsive to engagement of said body with said second contact only for energizing said relay, and means for preventing deenergization of said relay until said body has disengaged from both of said contacts.

16. In a vehicle brake system, in combination, a brake cylinder, a magnet valve device operable when energized to effect a supply of fluid under pressure to said brake cylinder, a second magnet valve device operable when deenergized to effect a release of fluid under pressure from said brake cylinder, a retardation controller device having a first contact and a second contact and a body operated according to the rate of retardation of the vehicle for first engaging said first contact and for then engaging said second contact, means responsive to engagement of said body with said second contact only for deenergizing both of said magnet valve devices, and means for preventing reenergization of said first magnet valve device until said body has disengaged from both of said contacts but permitting reenergization of said second magnet valve device when said body has disengaged from said second contact.

17. In a vehicle brake system, in combination, a brake cylinder, a retardation controller device having a trackway of different degrees of slope, contacts disposed along the sides of said trackway, a metallic ball adapted to be rolled along said trackway by force of inertia, magnet valve devices for controlling the supply of fluid under pressure to and its release from said brake cylinder, and means for controlling said magnet valve devices upon engagement of said ball with said contacts.

GEORGE W. BAUGHMAN.